US011048810B2

(12) United States Patent
Gorsica et al.

(10) Patent No.: US 11,048,810 B2
(45) Date of Patent: Jun. 29, 2021

(54) ELECTRONIC DEVICE THAT SCANS FOR WEARABLE DEVICE WITH ACCESS KEY

(71) Applicant: MOTOROLA MOBILITY LLC, Chicago, IL (US)

(72) Inventors: John J. Gorsica, Round Lake, IL (US); Rachid Alameh, Crystal Lake, IL (US); Jarrett K. Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 105 days.

(21) Appl. No.: 16/395,344

(22) Filed: Apr. 26, 2019

(65) Prior Publication Data
US 2020/0342126 A1 Oct. 29, 2020

(51) Int. Cl.
*G06F 21/00* (2013.01)
*G06F 21/62* (2013.01)
*H04L 29/06* (2006.01)

(52) U.S. Cl.
CPC ............ *G06F 21/62* (2013.01); *H04L 63/083* (2013.01); *H04L 63/0853* (2013.01); *H04L 63/105* (2013.01); *H04L 63/107* (2013.01)

(58) Field of Classification Search
CPC ..... G06F 21/62; H04L 63/083; H04L 63/105; H04L 63/107; H04L 63/0853
See application file for complete search history.

(56) References Cited

U.S. PATENT DOCUMENTS

| 9,344,436 | B1* | 5/2016 | Sheng | H04L 63/08 |
| 9,727,749 | B2* | 8/2017 | Tzeng | G06F 21/629 |
| 9,961,547 | B1* | 5/2018 | Molina-Markham | H04L 67/22 |
| 2005/0088525 | A1* | 4/2005 | Stavely | H04N 1/0097 348/207.1 |
| 2009/0097718 | A1* | 4/2009 | Li | H04N 5/232 382/124 |
| 2010/0317323 | A1* | 12/2010 | Facemire | H04L 63/107 455/411 |
| 2013/0305354 | A1* | 11/2013 | King | G06F 21/6281 726/19 |
| 2014/0283012 | A1* | 9/2014 | Eggerton | G06F 21/629 726/19 |
| 2015/0070134 | A1* | 3/2015 | Nagisetty | H04W 12/06 340/5.61 |

(Continued)

*Primary Examiner* — Jeffrey C Pwu
*Assistant Examiner* — William A Corum, Jr.
(74) *Attorney, Agent, or Firm* — Isidore PLLC

(57) ABSTRACT

An electronic device includes a user interface device and a wireless transceiver that scans for a wearable device within a threshold distance of the electronic device. The wearable device has an access key. A memory of the electronic device contains: (i) an access data structure; (ii) protected content; and (iii) an access application. A controller of the electronic device is communicatively coupled to the user interface device, the wireless receiver, and the memory. The controller executes the access application to enable the electronic device to determine whether the access key of a detected wearable device maps to a record in the access data structure identifying privileges associated with the protected content of the electronic device. Privileged interaction is enabled, via the user interface device, with the protected content in response to determining that the access key maps to the record having the privileges.

17 Claims, 6 Drawing Sheets

(56) References Cited

U.S. PATENT DOCUMENTS

| | | | |
|---|---|---|---|
| 2015/0082406 A1* | 3/2015 | Park | H04W 12/08 726/9 |
| 2015/0135284 A1* | 5/2015 | Bogard | G06F 21/35 726/5 |
| 2017/0357523 A1* | 12/2017 | Benson | H04L 63/107 |
| 2018/0007558 A1* | 1/2018 | Maragoudakis | H04M 1/7253 |
| 2018/0218160 A1* | 8/2018 | Wetherall | G06F 16/219 |
| 2020/0112569 A1* | 4/2020 | Goenka | H04L 63/105 |
| 2020/0233949 A1* | 7/2020 | Xia | H04L 63/083 |

* cited by examiner

ELECTRONIC DEVICE THAT SCANS FOR WEARABLE DEVICE WITH ACCESS KEY

BACKGROUND

1. Technical Field

The present disclosure relates generally to electronic devices and in particular to user privileges for accessing an electronic device.

2. Description of the Related Art

Electronic devices such as computer workstations, laptops, smartphones, tablets, etc., often contain sensitive and valuable content that users expect to be protected. Such content can include documents, digital images, and audio and/or video recordings. Protected content can include information gathered during usage of the electronic device, such as being used for navigation, communication, and personal data storage. Electronic devices can also be utilized as a repository for financial, contact data, and reference material for a user. Additionally, protected content can include the configuration and preferences made for applications and/or the graphical user interface of the device. Users may have invested considerable effort over a long time to get the electronic device set up in a customized way. Thus, there has been significant development towards protecting the reliability and security of electronic devices, including providing protections against accidental deletions of content.

Oftentimes, a user of a personal electronic device may allow another person, such as a child or friend, to use the personal electronic device. In some instances, such electronic devices do not have abilities for different login accounts to be setup. The borrower of the device may have unfettered use to inadvertently delete content or re-arrange the configuration of the device.

Also, for devices that allow setting up multiple user accounts, the process of setting up these different accounts on each electronic device to allow specific access and/or administrative privileges to only certain content can be cumbersome. Administrators of a business or enterprise may be responsible for a large population of electronic devices. Individually logging into each electronic device can be time consuming.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
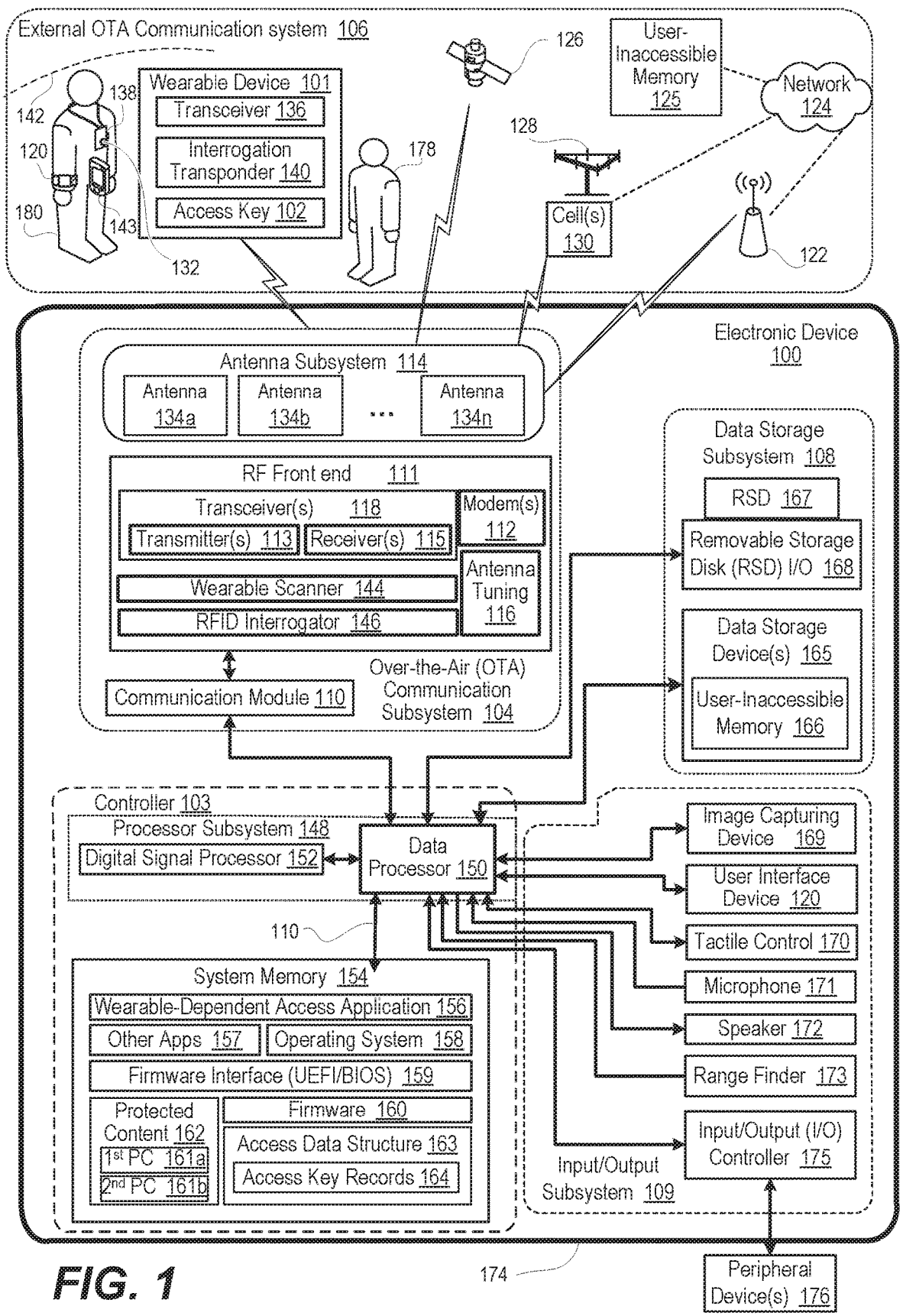
FIG. 1 is a functional block diagram illustrating an electronic device that provides levels of content protection based on proximity to a wearable device, according to one or more embodiments.

According to aspects of the present innovation, an electronic device, a method, and a computer program product provide controlling user access to privileged/protected content of the electronic device based on detection of an access key embedded within a wearable device. The method includes scanning, by a wireless transceiver of the electronic device, for detection of a wearable device having an access key stored thereon, the wearable device being within a threshold distance of the electronic device. A controller of the electronic device determines whether the access key of a detected wearable device maps to a record in an access data structure stored in a memory of the electronic device, the record identifying privileges associated with protected content of the electronic device. In response to determining that the access key maps to the record identifying the privileges, the controller enables privileged interaction with the protected content via a user interface device of the electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a functional block diagram illustrating example electronic device 100 that controls user access to privileged/protected content based on detection of an access key embedded within a wearable device. A controller of electronic device 100 scans for wearable device(s) 101 having access key 102. Controller 103 of electronic device 100 controls access privileges to electronic device 100 based on whether access key 102 is detected and validated. Electronic device 100 can be one of a plurality of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or another processing device connected to a wireless modem. These various devices all provide and/or include the necessary hardware and software to support the various wireless or wired communication functions as part of a communication system. Electronic device 100 can also be an over-the-air link in a communication system. Electronic device 100 can be intended to be portable, hand-held, wearable, detachable, positioned in a fixed location, or mounted to a movable vehicle. Examples of such over-the-air link electronic devices 100 include a wireless modem, an access point, a repeater, a wirelessly-enabled kiosk or appliance, a femtocell, a small coverage area node, and a wireless sensor, etc. Electronic device 100 can have computing functionality directed to local functionality without wide area communication capabilities.

Referring now to the specific component makeup and the associated functionality of the presented components, electronic device 100 includes over-the-air (OTA) communication subsystem 104 that communicates with external OTA communication system 106. Electronic device 100 provides computing and data storage functionality in support of OTA communication with external OTA communication system 106. Electronic device 100 also provides other functions with controller 103, data storage subsystem 108, and input/output (I/O) subsystem 109 that are communicatively coupled to each other via a system interlink 110.

OTA communication subsystem 104 includes communication module 110 that operates in baseband to encode data for transmission and decodes received data, according to a predetermined communication protocol. OTA communication subsystem 104 includes radio frequency (RF) front end 111 having one or more modem(s) 112. Modem(s) 112 modulate baseband encoded data from communication module 110 onto a carrier signal to provide a transmit signal that is amplified by transmitter(s) 113. Modem(s) 112 demodulates the received signal from node 122 detected by antenna subsystem 114. The received signal is amplified and filtered by receiver(s) 115, which demodulate received encoded data from a received carrier signal. Antenna tuning circuitry 116 adjusts antenna impedance of antenna subsystem 114. Antenna tuning circuitry 116 improves antenna efficiency at desired transmit or receive frequencies of transmitter(s) 113 and receiver(s) 115, respectively, within transceiver(s) 118. In one or more embodiments, electronic device 100 is proximate to, or on, a body generating a lossy dielectric effect for electronic device 100. Antenna tuning circuitry 116 is electrically coupled to antenna subsystem 114 to compensate for a lossy dielectric effect.

Controller 103 controls the OTA communication subsystem 104, user interface device 120, and other functions and/or operations of electronic device 100. These functions and/or operations include, but are not limited to including, application data processing and signal processing. Electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 110) are illustrated in FIG. 1, it is to be understood that more, fewer, or different interconnections may be present in other embodiments.

In one or more embodiments, controller 103, via OTA communication subsystem 104, performs multiple types of OTA communication with external OTA communication system 106. OTA communication subsystem 104 can communicate with one or more personal access network (PAN) devices within external OTA communication system 106, such as smart watch 120 that is reached via Bluetooth connection. In one or more embodiments, OTA communication subsystem 104 communicates with one or more locally networked devices via a wireless local area network (WLAN) link provided by WLAN node 122. WLAN node 122 is in turn connected to wide area network 124, such as the Internet. User-inaccessible memory 125 can be linked via network 124. In one or more embodiments, OTA communication subsystem 104 communicates with global positioning system (GPS) satellites 126 to obtain geospatial location information. In one or more embodiments, OTA communication subsystem 104 communicates with radio access network (RAN) 128 having respective base stations (BSs) or cells 130. RANs 128 are a part of a wireless wide area network (WWAN) that is connected to wide area network 124 and provides data and voice services. In one or more embodiments, OTA communication subsystem 104 communicates with passive radio frequency identification (RFID) devices 132. OTA communication subsystem 104 interrogates RFID device 132 with an encoded radio frequency (RF) signal that results in a returned encoded response. In one or more embodiments, antenna subsystem 114 includes multiple antenna elements 134a-n that are individually tuned to selected RF bands to support different RF communication bands and protocols. Antenna elements 134a-n can be used in combination for multiple input multiple output (MIMO) operation for beam steering and spatial diversity.

In the described embodiments, OTA communication subsystem 104 scans for access key 102 in wearable device(s) 101 using one or more of the communication networks. In one or more embodiments, wearable device 101 is smart watch 120 having active transceiver 136. In one or more embodiments, wearable device 101 is RFID device 132 embedded in identification badge 138 and having passive interrogation transponder 140. In one or more embodiments, threshold distance 142 between electronic device 100 and wearable device 101 is based on physical reception range of OTA communication subsystem 104 or detected range. In one or more embodiments, electronic device 100 performs geofencing of wearable device(s) 101. Mobile communication device 143 can be capable of detecting wearable device 101 at a distance greater than the threshold distance 142. Geofencing defines an area around mobile communication device 143 for triggering when wearable device 101 is close enough to trigger administrator privileges. In one embodiment, range assessment is performed by wearable device 101 assessing transmission/communication of mobile communication device 143. In an alternate embodiment, range assessment is performed in the reverse, by mobile communication device 143 assessing wearable device transmission. In one or more embodiments, OTA communication subsystem 104 can include a dedicated wearable scanner 144 or RFID interrogator 146 that are dedicated to detecting wearable device(s) 101. Scanning can be in response to a trigger event. For example, scanning can occur when user interface device 120 is prompted to accept user inputs. For clarity, a single threshold distance 142 is shown. In one or more embodiments, more than one threshold distance (not shown) can be implemented. For example, a first threshold distance 142 can be set close to electronic device 100 that is indicative of physical control of electronic device 100 by wearer of wearable device 101. A second threshold distance can be farther from electronic device 100, indicative of being able to visually observe another user of electronic device 100. A third threshold distance can be farther still from electronic device 100, indicative that electronic device 100 has not left an assigned location but is not under active supervision. Privileges for accessing and modifying protected content can change based on which threshold distance is determined.

Controller 103 includes processor subsystem 148, which executes program code to provide functionality of the electronic device 100. Processor subsystem 148 includes one or more central processing units (CPUs) ("data processor") 150. In one or more embodiments, processing subsystem 148 includes a digital signal processor (DSP) 152. Controller 103 includes system memory 154, which contains actively used program code and data. In one or more embodiments, system memory 154 includes therein a plurality of such program code and modules, including applications such as wearable-dependent access application 156 and other applications 157. System memory 154 can also include operating system (OS) 158, firmware interface 159 such as basic input/output system (BIOS) or Uniform Extensible Firmware Interface (UEFI), and platform firmware 160. These software and/or firmware modules have varying functionality when their corresponding program code is executed by processor subsystem 148 or secondary processing devices within electronic device 100. System memory 154 contains computer data such as first and second protected content (PC) 161a, 161b of protected content 162. System memory 154 contains computer data such as access data structure 163 containing access key records 164.

Data storage subsystem 108 provides nonvolatile storage accessible to controller 103. For example, data storage subsystem 108 can provide a large selection of other applications 157 that can be loaded into system memory 154. In one or more embodiments, local data storage device(s) 165 includes hard disk drives (HDDs), optical disk drives, solid state drives (SSDs), etc. Local data storage device(s) 165 can include user-inaccessible memory 166 for secure backup, such as to mitigate malware and malicious agents. In one or more embodiments, removable storage device (RSD) 167 that is received in RSD interface 168 is a computer program product or computer readable storage device, which can be referred to as non-transitory. RSD 167 can be accessed by controller 103 to provision electronic device 100 with program code. When executed by controller 103, the program code provides the functionality to electronic device 100 to perform aspects of the present innovation described herein.

I/O subsystem 109 includes input and output devices. For example, image capturing device 169, such as a camera, can receive gestures and other image data. User interface device 120 presents visual or tactile outputs as well as receives user inputs. Tactile/haptic control 170 provides an interface such as for braille reading or manual inputs. Microphone 171 receives user audible inputs. Audio speaker 172 provides audio output, including audio playback and alerts. Range finder 173 emits a waveform of energy, such as acoustic, infrared, radio frequency (RF), etc., whose time of flight is used to measure distance to a reflecting object. I/O subsystem 109 can be wholly or substantially encompassed by device housing 174. In one or more embodiments, I/O controller 175 connects to one or more peripheral devices 176 that can include additional I/O functionality. I/O controller 175 can also interface to a wired local access network (LAN) (not shown).

Electronic device 100 can be in the possession of person 178 who does not have a wearable device 101 or does not have a wearable device 101 with an access key 102 with sufficient access privileges for accessing specific protected content within electronic device 100. Administrator 180 has wearable device 101 with access key 102. Wireless transceiver 118 of electronic device 100 scans for wearable device 101 within threshold distance 142 of electronic device 100. In one or embodiments, electronic device 100 is actively scanning prior to a person interacting with user interface device 120. In one or more embodiments, electronic device 100 does not scan for wearable device 101 until an attempt is made to access or modify privileged content. For example, user interface device 120 can be inactive for power savings. A trigger event occurs that prompts user interface device 120 to be activate. The trigger event can initiate scanning for wearable device 101. Threshold distance 142 can be based on reception range between electronic device 100 and wearable device 101. Alternatively, threshold distance 142 can be based on geofencing of the electronic device 100. Controller 103 is communicatively coupled to user interface device 120, wireless receiver 115, and system memory 154. Controller 103 executes wearable-dependent access application 156 to enable electronic device 100 to provide functionality according to the present disclosure. Controller 103 determines whether access key 102 of detected wearable device 101 maps to one of access key records 164 in the access data structure 163. Access key records 164 identify privileges associated with protected content 162 of electronic device 100. For example, privileges identify one or more allowed actions such as: (i) accessing content; (ii) temporarily modifying content; (iii) adding new content; (iv) deleting existing content; and (v) permanently modifying content. Controller 103 enables privileged interaction via user interface device 120 with protected content 162 in response to determining that access key 102 maps to one of access key record(s) 164 having the privileges. In one or more embodiment, disabling or restricting privileged interaction is executed according to user settings on electronic device 100. A level of privileged access, such as restricted or guest access key, or a particular identified user, can have privileges defined and customized in user settings. For example, an administrator can select to either disable all privileged interaction, to allow read only access to protected content, to allow read and write access with deferred deletion of protected content, or allow all privileged interaction. User settings can be tailored for particular portions of protected content 162.

Figure 2:
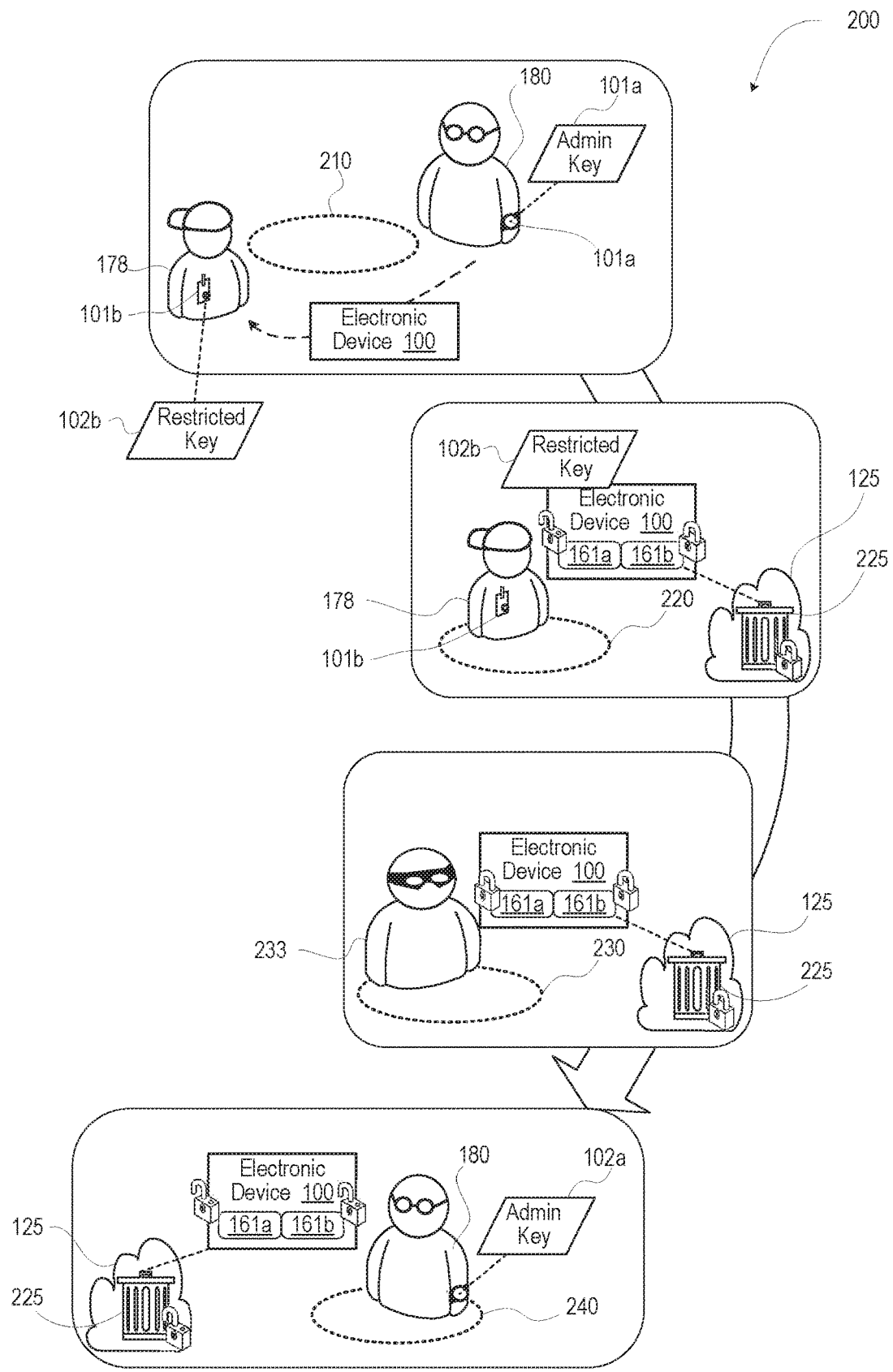
FIG. 2 illustrates a sequence of scenarios in which an electronic device changes operation based on proximity to a wearable device that contains an access key, according to one or more embodiments.

FIG. 2 illustrates a sequence of location and time scenarios 200 in which electronic device 100 changes operation based on proximity to wearable device 101a that contains access key 102a. In one or more embodiments, electronic device 100 has two or more levels of privileged access to protected content 161a-b, such as: (i) full administrative privileges; (ii) restricted privileges to a subset of possible interactions with protected content 161a-b; (iii) differing privileges with regard to each protected content 161a-b; (iv) guest privileges that prevents any permanent changes; and (v) emergency privileges that accesses a discrete number of functions for time critical and proscribed capabilities. In one or more embodiments, restricted privileges enable creation of work products or make system configuration changes that affect previously stored device data and software products. Administrative privileges authorize making the changes permanent. Electronic device 100 can be one device in a distributed computing infrastructure that is managed with one or more wearable devices 101a-b, allowing electronic device 100 to be used seamlessly with other electronic devices 100.

First location and time scenario 210 includes administrator 180 having wearable device 101a with administrative access key 102a. Person 178 has wearable device 101b having reduced or restricted access key 102b. Guest or emergency privileges could correspond to having no wearable device present. Administrator 180 gives electronic device 100 to person 178. Electronic device 101a detects administrative access key 102a in close proximity (or within the detectable threshold range), and electronic device 101a enables administrative privileges for modifying content on and/or configuration settings of electronic device 101a. While administrator 180 is in close proximity, administrator 180 can supervise or monitor person 178 who is using electronic device 100.

In second location and time scenario 220, person 178 has possession of electronic device 100. Wearable device 101a with administrative access key 102a is no longer detected, so administrative privileges are withdrawn. Electronic device 100 detects restricted access key 102b, enabling privileged interaction by person 178 with protected content 161a but not with protected content 162. Changes made to protected content 161a can be temporary, with any changed or deleted content 225 maintained in user-inaccessible memory 125. In one or more embodiments, administrative privileges are required to make permanent changes. Maintaining backup information in user-inaccessible memory 125 enables temporary changes to be made to electronic device 100 that can later be reversed.

In third location and time scenario 230, electronic device 100 is misplaced or left unattended by person 178 and is in possession of unauthorized person 233. Electronic device 100 does not detect any wearable device with an access key and responds by disabling privileged interaction (by unauthorized person 233, or others) with protected content 161a-b. Any maliciously caused changes to protected content 161a-b does not affect the version of protected content maintained within user-inaccessible memory 125.

In fourth location and time scenario 240, electronic device 100 is in the possession of administrator 180. Electronic device 100 detects administrator access key 102a, enabling privileged interaction with protected content 161a-b. Original protected content in user-inaccessible memory 125 can be restored or permanently deleted or overwritten by administrator 180.

Figure 3:
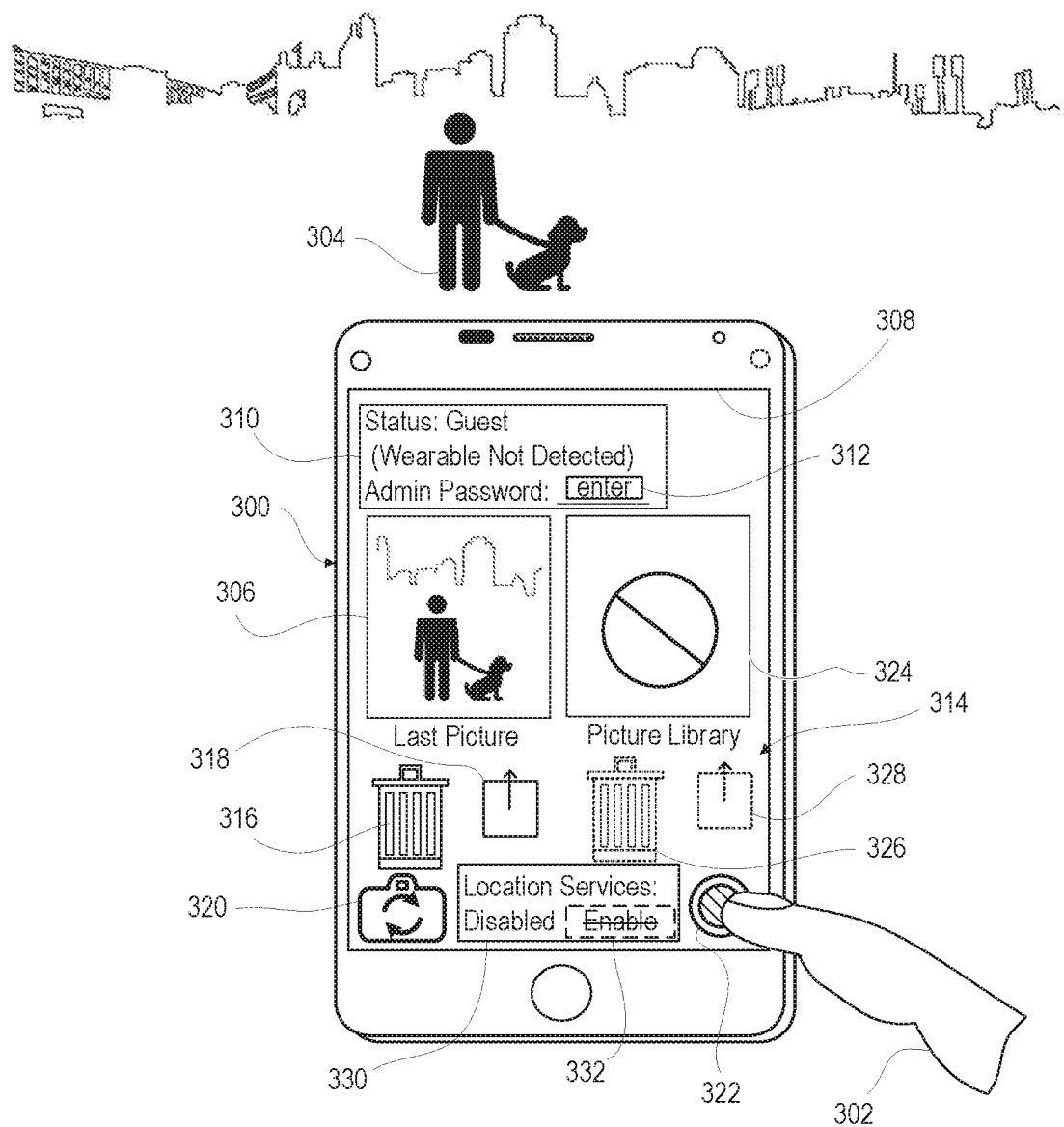
FIG. 3 depicts an example electronic device that changes operation of a user interface device based on an absence or a presence of a wearable device within a distance threshold, according to one or more embodiments.

FIG. 3 illustrates example electronic device 300, which is one embodiment of electronic device 100 of FIG. 1. In one or more embodiments, electronic device 300 is a portable user device that has been loaned to another person 302 who does not have a wearable device with an appropriate access key. For example, the administrator 304 poses for a picture 306 taken with electronic device 300 by person 302. User interface device 308 indicates a status 310 that administrator 304 is outside of a distance threshold associated with having physical control of electronic device 300. Electronic device 300 allows guest access privileges that include an administrator password prompt 312 to manually enable administrator access privileges. In the illustrated embodiment, camera controls 314 are partially enabled with respect to new digital images and videos captured during a current guest session. The camera controls enabled are delete current picture icon 316, forward current picture icon 318, toggle front/rear camera icon 320, and start camera icon 322. However, camera controls 314 are disabled with respect to digital images and videos captured prior to the current guest session. Thus, photo library viewer 324 is blocked, delete selected photo icon 326 is grayed out, and forward selected photo icon 328 is grayed out. Another configuration that affects camera controls 314 is location services. User interface device 308 provides an indication 330 that previously enabled location services were disabled. A location service enable icon 332 is grayed out and crossed out to indicate that the icon cannot be selected. In an alternate embodiment, administrative privileges can extend to the picture controls for the new image or video, whereby only image capture is permitted (i.e., start camera icon) by the guest, and other features such as delete current picture icon 316 and forward current picture icon 318 are greyed out and cannot be selected.

Figure 4:
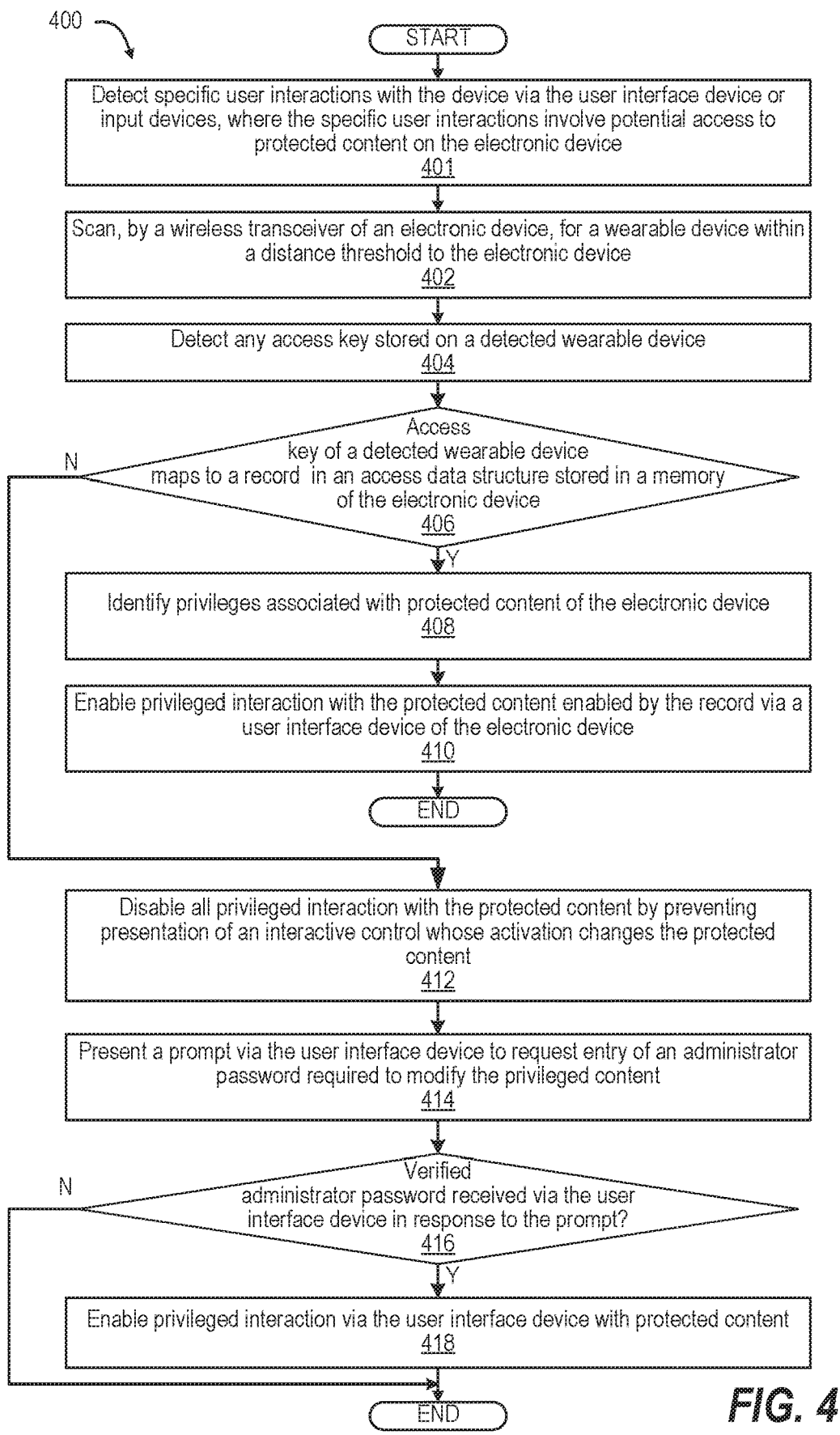
FIG. 4 is a flow diagram of a method of protecting content on an electronic device when the electronic device is not in proximity to a verified wearable device, according to one or more embodiments.

FIG. 4 provides method 400 of protecting content on electronic device 100 (FIG. 1) when the electronic device is not in proximity to a verified wearable device 101 (FIG. 1) with an administrative access code. In one or more embodiments, method 400 includes detecting specific user interactions with the electronic device via user interface device 120 (FIG. 1) or input devices, where the specific user interactions involve potential access to protected content on the electronic device 100 (FIG. 1) (block 401). Method 400 includes, in response to detecting the specific user interactions, scanning, by a wireless transceiver of an electronic device, for a signal from a wearable device within a distance threshold to the electronic device (block 402). In one embodiment, wearable device is communicatively connected to electronic device via a wireless technology, such as Wi-Fi. In another embodiment, wearable device transmits a signal with the access key encoded thereon using a one-way transmission medium, such as RFID or beacon. The transmission of the RFID signal from the wearable device can be triggered in response to a RFID ping/request broadcasted from electronic device or simple reception of a short range beacon emitted by transmitting device at repeating intervals say every few seconds. Method 400 includes detecting any access key stored on a detected wearable device (block 404). At decision block 406, method 400 includes determining, by controller 103 (FIG. 1) of electronic device 100 (FIG. 1), whether an access key of the detected wearable device maps to a record in an access data structure stored in a memory of the electronic device. In response to determining that the access key maps to a record in the memory of the electronic device, method 400 includes identifying, based on the access key, privileges associated with protected content of the electronic device (block 408). Method 400 includes enabling privileged interaction with the protected content via a user interface device of the electronic device (block 410). The level of privileged interaction can be based in part on the access key detected, where different access keys can be linked to or associated with different levels of access to the privileged/protected content. Then method 400 ends.

Returning to decision block 406, in response to determining that no detected access key maps to a record in the memory of the electronic device, method 400 includes disabling all privileged interaction with the protected content by preventing presentation of an interactive control required to implement changes to the protected content (block 412). Method 400 includes presenting a prompt via the user interface device to request entry of an administrator password required to modify the protected content (block 414). A determination is made at decision block 416 whether a verified administrator password is received via the user interface device in response to the prompt. In response receiving a verified administrator password, method 400 includes enabling privileged interaction via the user interface device (block 418). Then method 400 ends. In response to not receiving a verified administrator password, method 400 ends without privileged interaction being enabled.

Figure 5A:
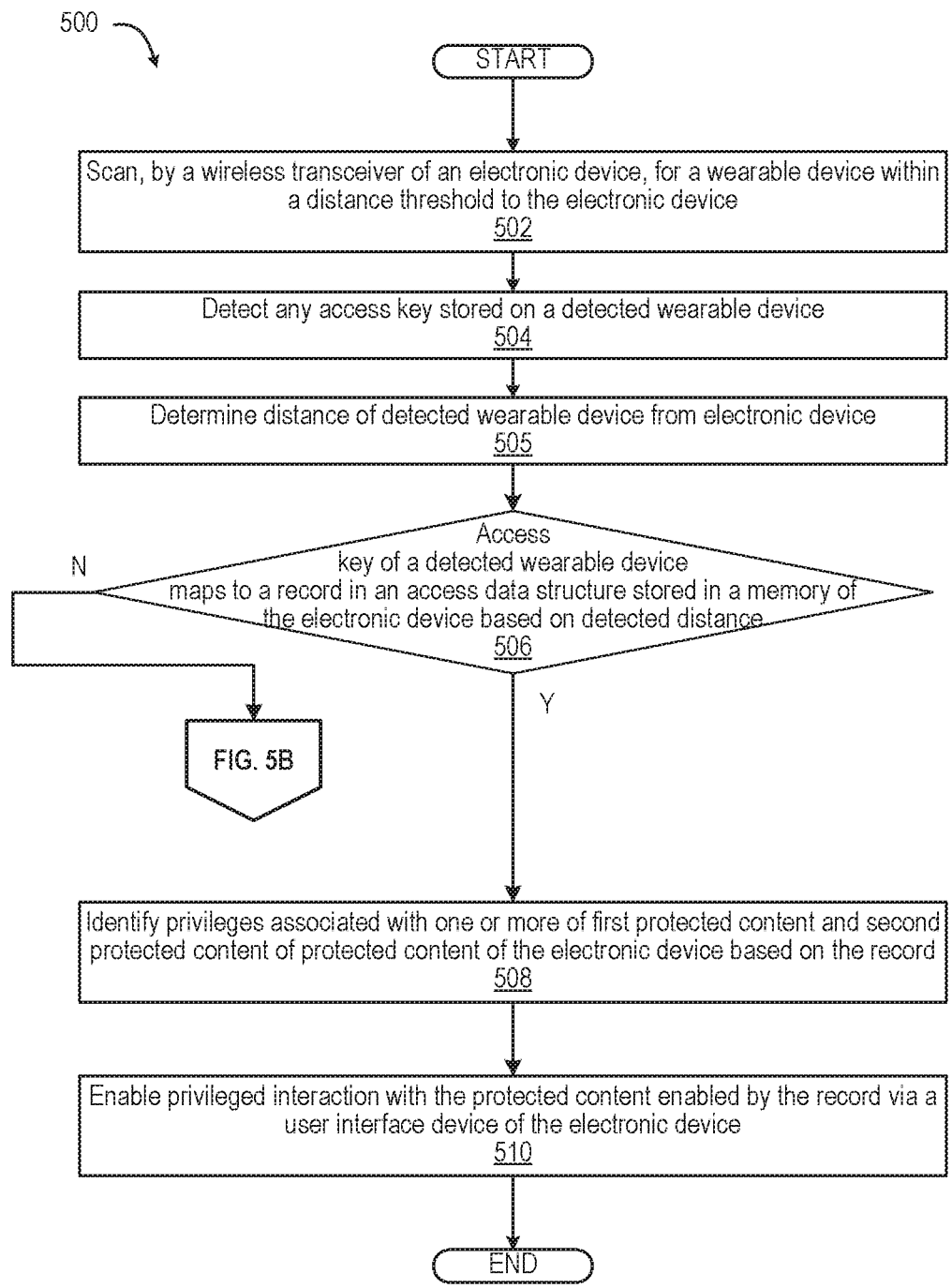
FIGS. 5A-5B are a flow diagram of a method of providing levels of user privileges to an electronic device based on a proximity of a verified wearable device to the electronic device, according to one or more embodiments.
Figure 5B:
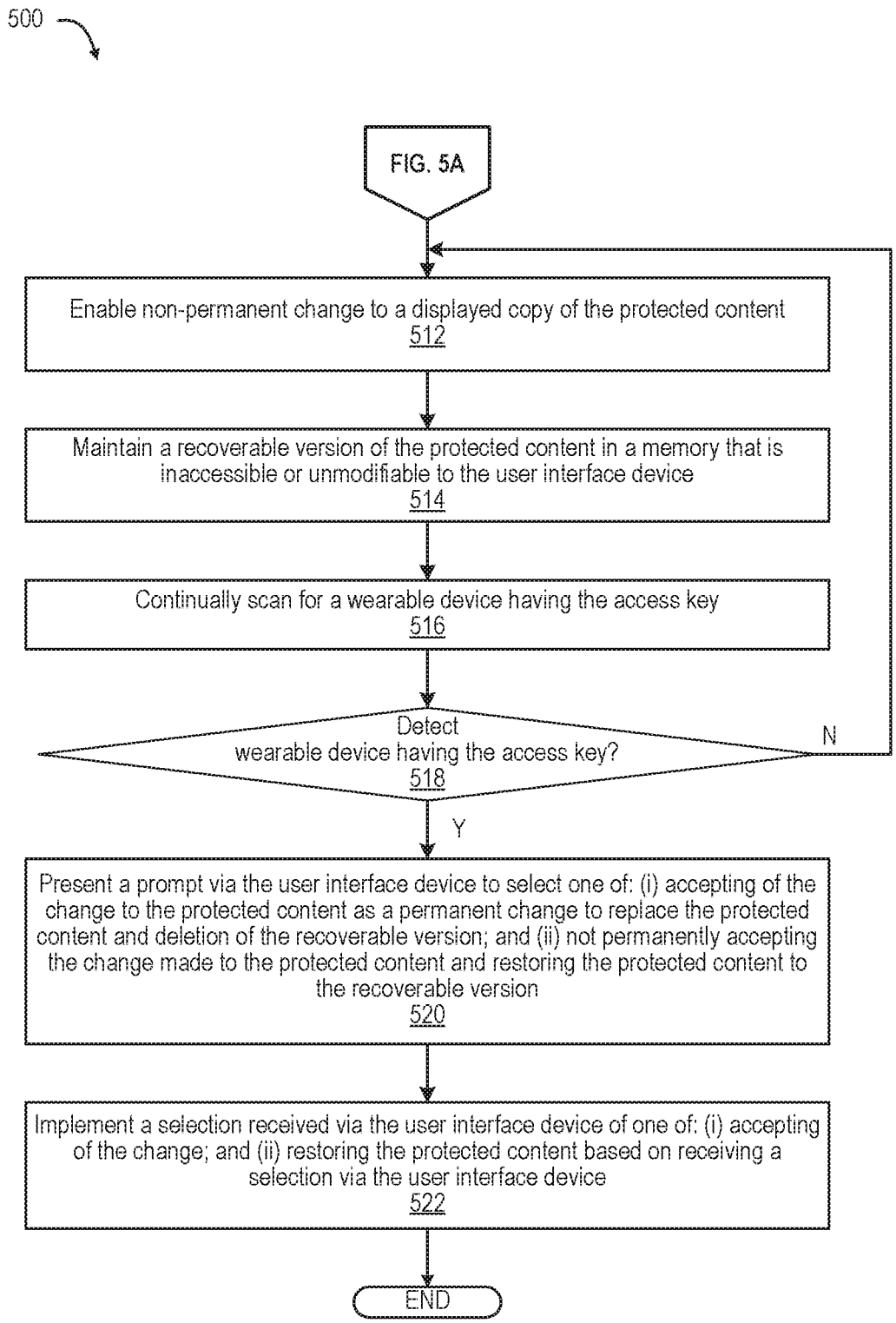

FIGS. 5A-5B present method 500 of providing levels of user privileges to electronic device 100 (FIG. 1) based on proximity of the electronic device 100 (FIG. 1) to a verified wearable device 101 (FIG. 1). In one or more embodiments, method 500 includes scanning, by wireless transceiver 118 (FIG. 1) of electronic device 100 (FIG. 1), for wearable device 101 (FIG. 1) within a distance threshold to the electronic device (block 502). Method 500 includes detecting any access key stored on a detected wearable device (block 504). Method 500 includes determining a distance of the detected wearable device from the electronic device (block 505). A determination is made, by controller 102 (FIG. 1) of electronic device 100 (FIG. 1), whether an access key of a detected wearable device maps to a record in an access data structure stored in a memory of the electronic device based on detected distance (decision block 506). In response to determining that the access key maps to a record in the memory of the electronic device, method 500 includes identifying privileges associated with one or more of first protected content and second protected content among the protected content of the electronic device based on the record (block 508). Method 500 includes enabling privileged interaction with the protected content enabled by the record via user interface device 120 (FIG. 1) of the electronic device 100 (FIG. 1) (block 510). Then method 500 ends.

In response to determining in decision block 506 that no detected access key maps to a record in the memory of the electronic device, method 500 transitions to FIG. 5B and includes enabling non-permanent change to a displayed copy of the protected content (block 512) should there be a statement to the effect that non-permanent could include deferral. Deferral refers to an action taken when wearable device is away but only enforced when the wearable device is once again present. The enforcement can require notifying the user that prior action is now going to be carried out. Method 500 includes maintaining a recoverable version of the protected content in a memory that is inaccessible or unmodifiable to the user interface device (block 514). Method 500 includes continually scanning for a wearable device having the access key (block 516). A determination is made whether a wearable device is detected having the access key (decision block 518). In response to not detecting a wearable device having the access key, method 500 returns to block 512. In response to detecting the wearable device having the access key, method 500 includes presenting a prompt via the user interface device to select one of: (i) accepting of the change to the protected content as a permanent change to replace the protected content and deletion of the recoverable version; and (ii) not permanently accepting the change made to the protected content and restoring the protected content to the recoverable version (block 520). Method 500 includes implementing the selection received via the user interface device of one of: (i) accepting of the change; and (ii) restoring the protected content (block 522). Then method 500 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    a user interface device;
    a wireless transceiver that scans for a wearable device within at least one threshold distance of the electronic device, the wearable device having an access key;
    a memory containing: (i) an access data structure; (ii) protected content; and (iii) an access application; and
    a controller communicatively coupled to the user interface device, the wireless receiver, and the memory, and which executes the access application to enable the electronic device to:
        enable only non-permanent change to the protected content, in response to determining that no access key was detected having privileges associated with the protected content while a change to the protected content is being implemented via the user interface device; and
        in response to later detecting the wearable device having an administrative access key following the enabling of non-permanent change to the protected content:
            determine whether the access key of the detected wearable device that is within the at least one threshold distance of the electronic device maps to a record in the access data structure identifying privileges associated with the protected content of the electronic device;
            implement a selection received via the user interface device of one of: (i) permanently accepting of the change; and (ii) restoring the protected content; and
            enable privileged interaction via the user interface device with the protected content in response to determining that the access key maps to the record having the privileges.

2. The electronic device of claim 1, wherein, in response to determining that no access key was detected having privileges associated with the protected content, the controller enables the electronic device to disable all privileged interaction with the protected content by altering presentation of an interactive control to indicate that the interactive control is unable to change the protected content.

3. The electronic device of claim 1, wherein, in response to determining that no access key was detected having privileges associated with the protected content, the controller enables the electronic device to:
    prevent modification of the protected content via the user interface device;
    present a prompt via the user interface device to request entry of an administrator password required to modify the protected content;
    determine whether a verified administrator password is received via the user interface device in response to the prompt; and
    enable privileged interaction via the user interface device with the protected content in response to determining that the verified administrator password is received.

4. The electronic device of claim 1, wherein:
    the protected content comprises first protected content and second protected content; and
    the controller enables the electronic device to:
        determine whether the detected access key maps to a record in the access data structure identifying privileges to one or more of the first protected content and the second protected content; and
        enable privileged interaction via the user interface device with the protected content enabled by the record.

5. A method comprising:
    scanning, by a wireless transceiver of an electronic device, for a wearable device within at least one threshold distance to the electronic device, the wearable device having an access key stored thereon;

enabling only non-permanent change to protected content on the electronic device, in response to determining that no access key was detected having privileges associated with the protected content while a change to the protected content is being implemented via the user interface device; and in response to later detecting the wearable device having an administrative access key following the enabling of non-permanent change to the protected content:

determining whether the access key of the detected wearable device that is within the at least one threshold distance of the electronic device maps to a record in an access data structure stored in a memory of the electronic device, the record identifying privileges associated with protected content of the electronic device;

implementing a selection received via the user interface device of one of: (i) permanently accepting of the change; and (ii) restoring the protected content; and enabling privileged interaction with the protected content via a user interface device of the electronic device.

6. The method of claim 5, further comprising disabling all privileged interaction with the protected content by altering presentation of an interactive control to indicate that the interactive control is unable to change the protected content.

7. The method of claim 5, further comprising:
in response to determining that no access key was detected having privileges associated with the protected content:
preventing modification of the protected content via the user interface device;
presenting a prompt via the user interface device to request entry of an administrator password required to modify the protected content;
determining whether a verified administrator password is received via the user interface device in response to the prompt; and
enabling privileged interaction via the user interface device with the protected content in response to determining that the verified administrator password is received.

8. The method of claim 5, wherein:
determining whether the access key of the wearable device that is detected maps to a record in the access data structure identifying privileges to one or more of first protected content and second protected content of the protected content; and
enabling privileged interaction via the user interface device with the protected content enabled by the record.

9. A computer program product comprising:
a non-transitory computer readable storage device; and
program code on the computer readable storage device that when executed by a processor associated with an electronic device, the program code enables the electronic device to provide the functionality of:
scanning, by a wireless transceiver of the electronic device, for a wearable device within at least one threshold distance to the electronic device, the wearable device having an access key stored thereon;
enabling only non-permanent change to protected content on the electronic device, in response to determining that no access key was detected having privileges associated with the protected content while a change to the protected content is being implemented via the user interface device; and
in response to later detecting the wearable device having an administrative access key following the enabling of non-permanent change to the protected content:
determining whether the access key of the detected wearable device that is within the at least one threshold distance of the electronic device maps to a record in an access data structure stored in a memory of the electronic device, the record identifying privileges associated with protected content of the electronic device;
implementing a selection received via the user interface device of one of: (i) permanently accepting of the change; and (ii) restoring the protected content; and
enabling privileged interaction with the protected content via a user interface device of the electronic device.

10. The computer program product of claim 9, wherein the program code enables the electronic device to provide the functionality of disabling all privileged interaction with the protected content by altering presentation of an interactive control to indicate that the interactive control is unable to change the protected content.

11. The computer program product of claim 9, wherein the program code enables the electronic device to provide the functionality of:
in response to determining that no access key was detected having privileges associated with the protected content:
preventing modification of the protected content via the user interface device;
presenting a prompt via the user interface device to request entry of an administrator password required to modify the protected content;
determining whether a verified administrator password is received via the user interface device in response to the prompt; and
enabling privileged interaction via the user interface device with the protected content in response to determining that the verified administrator password is received.

12. The computer program product of claim 9, wherein the program code enables the electronic device to provide the functionality of:
determining whether the access key of the wearable device that is detected maps to a record in the access data structure identifying privileges to one or more of first protected content and second protected content of the protected content; and
enabling privileged interaction via the user interface device with the protected content enabled by the record.

13. The electronic device of claim 1, wherein the controller further enables the electronic device to:
maintain a recoverable version of the protected content in a memory that is inaccessible to the user interface device; and
restore the protected content using the recoverable version.

14. The electronic device of claim 1, wherein the controller further enables the electronic device to:
in response to detecting the wearable device having the access key following the enabling of non-permanent change to the protected content, present a prompt via the user interface device to select one of: (i) acceptance of the change to the protected content as a permanent change to replace the protected content and deletion of the recoverable version; and (ii) non-acceptance of the change to the protected content and restoration of the protected content to the recoverable version.

15. The method of claim 5, further comprising:

maintaining a recoverable version of the protected content in a memory that is inaccessible to the user interface device; and restoring the protected content using the recoverable version.

16. The method of claim 15, further comprising:

in response to detecting the wearable device having the access key following the enabling of non-permanent change to the protected content, presenting a prompt via the user interface device to select one of: (i) accepting of the change to the protected content as a permanent change to replace the protected content and deletion of the recoverable version; and (ii) restoring the protected content to the recoverable version to not permanently accept the change made to the protected content.

17. The computer program product of claim 9, wherein the program code further enables the electronic device to provide the functionality of:

maintaining a recoverable version of the protected content in a memory that is inaccessible to the user interface device; and in response to detecting the wearable device having the access key following the enabling of non-permanent change to the protected content:

presenting a prompt via the user interface device to select one of: (i) accepting of the change to the protected content as a permanent change to replace the protected content and deletion of the recoverable version; and (ii) restoring the protected content to the recoverable version to not permanently accept the change made to the protected content; and implementing a selection received via the user interface device of one of: (i) accepting of the change; and (ii) restoring the protected content based on receiving a selection via the user interface device.

* * * * *